United States Patent [19]

Golz et al.

[11] Patent Number: 5,232,326
[45] Date of Patent: Aug. 3, 1993

[54] APPARATUS FOR CLEARING A PILE OF BULK MATERIAL

[75] Inventors: Hans-Joachim Golz, Ahlen, Fed. Rep. of Germany; Armin Supp, Roodepoort, South Africa

[73] Assignee: Krupp Polysius AG, Fed. Rep. of Germany

[21] Appl. No.: 878,761

[22] Filed: May 5, 1992

[30] Foreign Application Priority Data

May 7, 1991 [DE] Fed. Rep. of Germany ....... 4114903

[51] Int. Cl.$^5$ ............................................. B65G 65/02
[52] U.S. Cl. .................................... 414/133; 198/519
[58] Field of Search .................... 37/108 A, 105, 104, 37/80 A, 8; 198/519; 414/133

[56] References Cited

U.S. PATENT DOCUMENTS

| | | | |
|---|---|---|---|
| 1,849,754 | 3/1932 | Darrow | 37/108 A |
| 1,974,668 | 9/1934 | Souter | 37/8 |
| 3,658,169 | 4/1972 | Potthoff | 414/133 |
| 4,120,408 | 10/1978 | Gehring et al. | 198/520 |

FOREIGN PATENT DOCUMENTS 2020623 11/1979 United Kingdom ............... 414/133

Primary Examiner—David H. Bollinger
Assistant Examiner—Carol Wallace
Attorney, Agent, or Firm—Learman & McCulloch

[57] ABSTRACT

This apparatus for clearing and removing the bulk material from a pile of bulk material comprises a movable bridge, at least one scraper arrangement which is movable along this bridge and a bulk material conveyor arrangement which is also supported by the bridge and arranged in the proximity of the base of the heap, at least one movable bulk material activating tooth being held by the bridge in the region before this conveyor arrangement. In this way large stones or stone chippings are also reliably removed with rest of the bulk material.

15 Claims, 3 Drawing Sheets

APPARATUS FOR CLEARING A PILE OF BULK MATERIAL

The invention relates to apparatus for clearing and removing the bulk material from a pile of bulk material.

BACKGROUND OF THE INVENTION

Apparatus of the aforementioned type are sufficiently known in the art. The piles of bulk material can be pure storage piles or mixed piles in which different bulk materials can be loosely stored (piled up), such as for example cement raw materials, ores or the like.

In these known constructions a scraper arrangement which is arranged like a jib so as to be movable along a bridge (back-loading bridge) which is movable relative to an inclined face (front face) of the pile of bulk material, and this scraper arrangement can be brought into scraping engagement with this inclined face in such a way that the bulk material stored there is loosened and can trickle down to a conveyor arrangement which is also supported by the bridge in the region of the toe of the pile; this conveyor arrangement then delivers the cleared loose bulk material, generally in the cross direction, to a further conveyor arrangement. Scraper arrangements of a known type which are more or less wide—in comparison with the width of the inclined face to be cleared—can be used, for example beam-like scraper arrangements, rope-operated rakes, scraper rakes or the like. Continuously circulated scraper chains which are equipped with individual scraper blades and are guided on rollers through guide rails can preferably be used as the scraper arrangement on the underside of the bridge.

In these known clearing devices, so long as the bulk material stored in the pile consists of only relatively fine or medium-sized lumps, i.e., does not contain larger stones, the bulk material cleared from the bulk material pile on the said inclined face can be removed largely without problems by the conveyor arrangement of the bridge. However, if the bulk material stored in the pile contains large stones or stone chippings then the bulk material can no longer be readily back-loaded or removed with the said conveyor arrangement. It should be noted here that the majority of these large stones and stone chippings are located at the toe of the heap and the scraper blades of the conveyor arrangement which is constructed in particular as a scraper chain would work against these heavy stones which lie at the toe of the heap and thus at the bottom of the heap, and this leads to severe damage to the scraper blades, the rollers, the guide rails and also the scraper chain, since above all the thick stones in the region of the toe of the heap push the scraper blades upwards.

The object of this invention is to provide an improved apparatus of the general type described above wherein it is ensured with relatively simple means that large stones and stone chippings present in the bulk material in the region of the toe of the heap can also be taken up and removed without problems by the conveyor arrangement arranged on the bridge.

SUMMARY OF INVENTION

According to the invention, at least one bulk material activating tooth is supported by the bridge and is movable ensuring that in the region before the conveyor arrangement, bulk material which is scraped off from the inclined face of the pile by a scraper arrangement and delivered to a conveyor arrangement in the bulk material receiving region and large and heavy stones and stone chippings which lie at the bottom of the pile or in the region of the toe of the pile, are activated in such a way that these large stones and stone chippings are raised and surrounded to some extent by finer bulk material, i.e. finer and medium-sized bulk material settles around and under the thick and heavy stones so that when these large stones and stone chippings are lifted they remain at a somewhat higher level and thus can be relatively simply taken up and removed by the conveyor elements of the conveyor arrangement and in particular by the scraper blades of a scraper chain.

In this way—in contrast to known constructions—these conveyor elements, particularly scraper blades, are prevented from being pushed upwards by large stones lying at the bottom of the pile and thus causing the aforesaid damage. In this connection it must be imagined that the large stones and stone chippings can have edge lengths of for example 550×300×200 mm and larger. By the sensible use of at least one activating tooth (in the case of narrower scraper arrangements), preferably several such activating teeth (in the case of wider scraper arrangements, particularly scraper rakes) it is possible for the first time to use the conveyor arrangement reliably to remove or back-load even large and heavy stones from the region of the toe of the heap.

In an advantageous manner each bulk material activating tooth is preferably constructed in the form of an essentially straight, longer ripping tooth with a round or polygonal cross-section and arranged so that it hands freely downwards. In this case the free lower end projects into the toe region of the bulk material pile, and is only a small distance from the base of the pile, i.e. the activating tooth which projects freely downwards ends shortly before the base of the heap. In this way each activating tooth can activate substantially all of the bulk material stored at the bottom of the heap, and a meaningful movability of each bulk material activating tooth effects a certain stirring through of the quantity of bulk material which it has taken up.

THE DRAWINGS

The invention will be explained below with the aid of several embodiments which are illustrated in the drawings. These drawings have been kept largely schematic and in them:

DETAILED DESCRIPTION

The general construction of this apparatus for clearing and removing the bulk material from a pile of bulk material, referred to hereafter merely as a "clearing apparatus" will be explained first of all with the aid of FIGS. 1 and 2.

Figure 1:
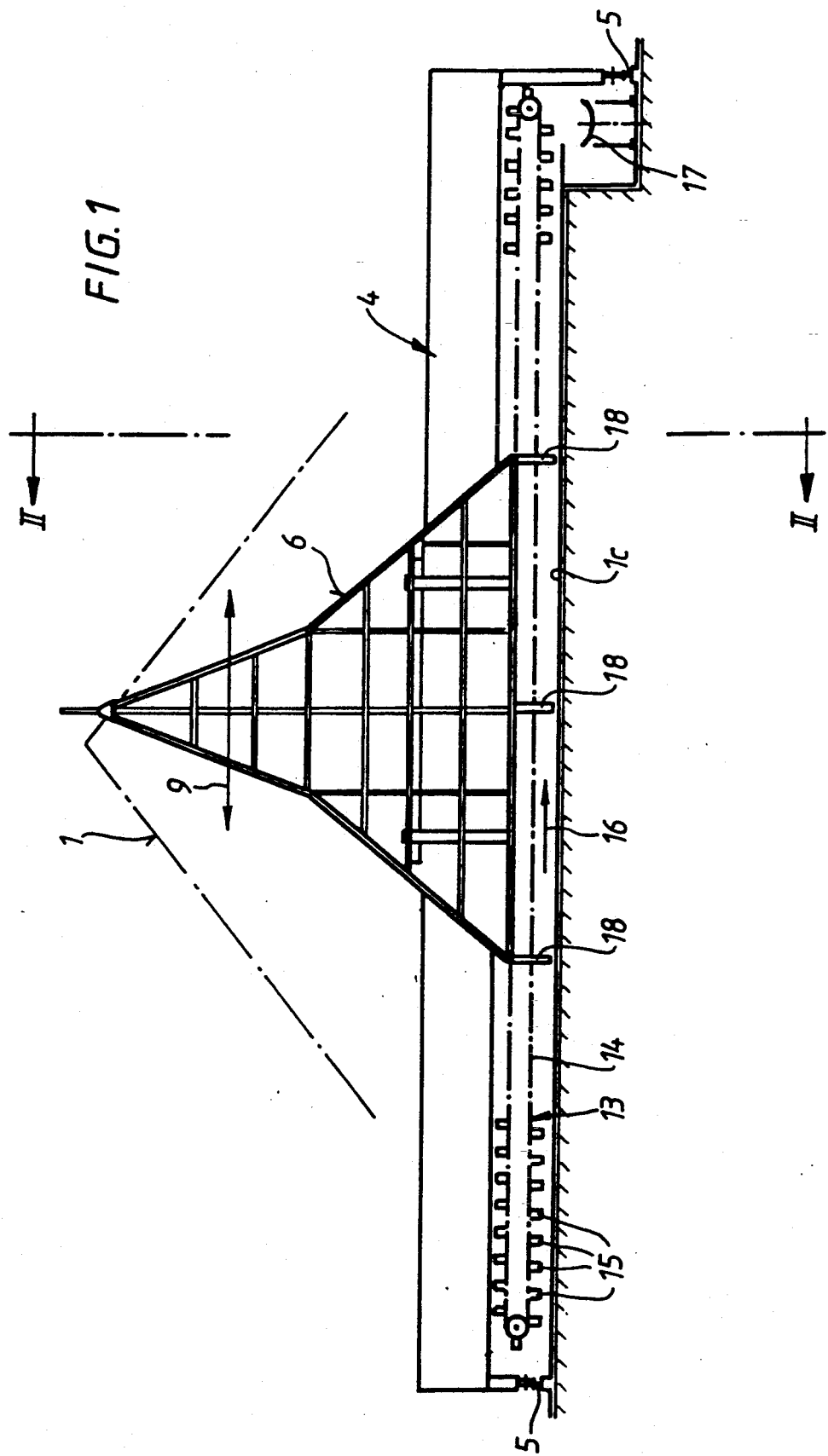
FIG. 1 shows a top view of the apparatus according to the invention from the inclined face of the bulk material heap.
Figure 2:
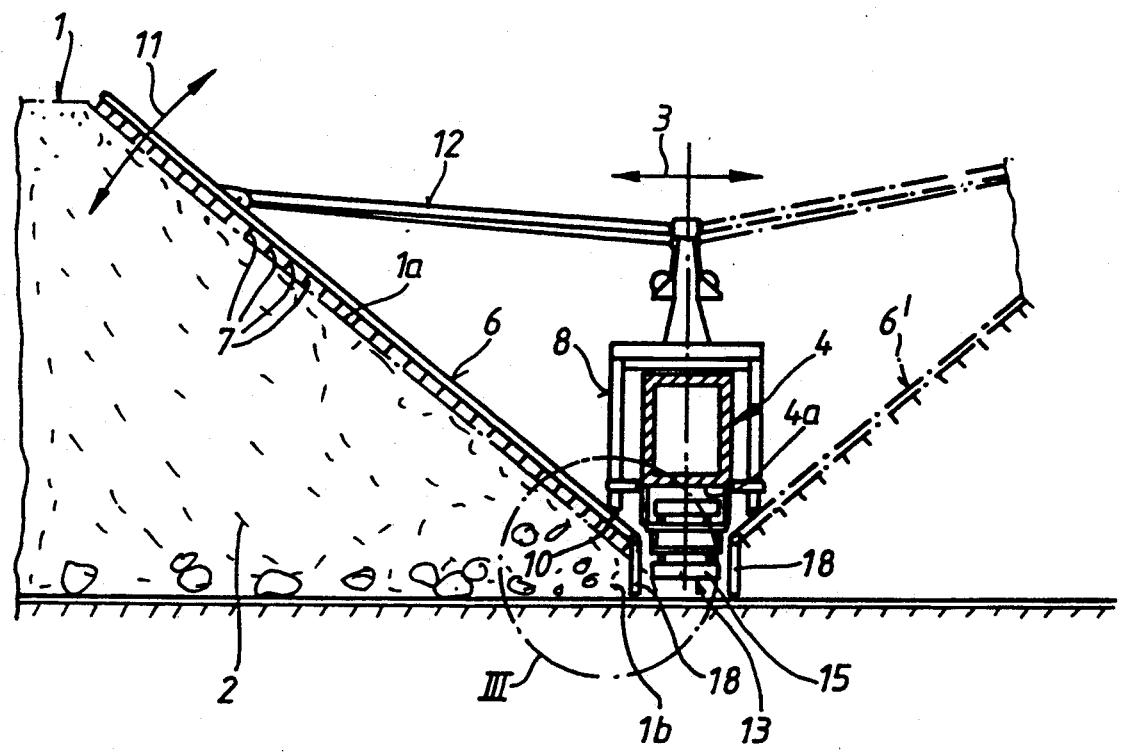
FIG. 2 shows a cross-sectional view of the apparatus, approximately along the line II—II in FIG. 1.

A pile 1 of bulk material which is defined by dash-dot lines is indicated in these FIGS. 1 and 2. The bulk material 2 stored in this pile is to be cleared from the front inclined face 1a with the aid of the clearing apparatus.

This clearing apparatus comprises a bridge 4 which is movable (cf. double arrow 3) relative to the inclined face 1a and serves as a back-loading bridge and in the present case spans the bulk material pile 1 over its entire width (FIG. 1) and is movable in the usual way in the direction of the double arrow 3 in the region of the two long sides of the heap on rails 5. A jib-like scraper arrangement 6 which can be constructed in any suitable manner, for example as a beam-like scraper arrangement, as a rope-operated rake, a scraper rake or the like, is borne by this bridge 4. In the present example the scraper arrangement is preferably formed by a scraper rake 6 which can be constructed in a manner which is known per se, particularly in the form shown in FIG. 1, and has on its underside a plurality of scraping teeth 7 with which the scraper rake 6 can engage in a scraping manner in the said inclined face 1a in order to loosen and clear the bulk material there so that it can trickle down along this inclined face 1a to the toe of the heap 1b.

This scraper rake 6 can be supported by the bridge 4 in the usual way by means of an undercarriage 8 in such a way that on the one hand it can move along the bridge 4 in the direction of the double arrow 9 (FIG. 1) at right angles to the inclined face 1a and on the other it can be moved or pivoted about a horizontal axis 10 in the direction of the double arrow 11 relative to the inclined face 1a, so that it is held on the bridge undercarriage 8 so that its inclination is adjustable relative to the inclined face 1a to be scraped off. This adjustment of the inclination can be made for example with the aid of a rope winch 12.

In the toe region of the heap 1b or on the underside of the bridge 4 the bridge also supports a conveyor arrangement which is preferably constructed in the form of a scraper conveyor 13 which can be of known construction and comprises a chain 14 guided by rollers and guide rails and circulating in the longitudinal direction of the bridge as well as scraper blades 15 attached to this chain and by means of which the bulk material 2 scraped off from the inclined face 1a by the scraper rake 6 and delivered is conveyed at right angles to the inclined face 1a in the direction of the arrow 16 to a conveyor belt 17 arranged on one long side of the heap (cf. FIG. 1).

In this clearing apparatus it is of particular importance that in the region before the conveyor arrangement, that is to say before the scraper conveyor 13, i.e. on its bulk material delivery side, at least one movable bulk material activating tooth is provided which is also held by the bridge 4. Since in the embodiment illustrated in the drawing the scraper arrangement is formed by a scraper rake 6 which is relatively wide in comparison with the inclined face 1a of the bulk material pile 1, several such activating teeth 18 are provided (three activating teeth are shown in FIG. 1).

Figure 3:
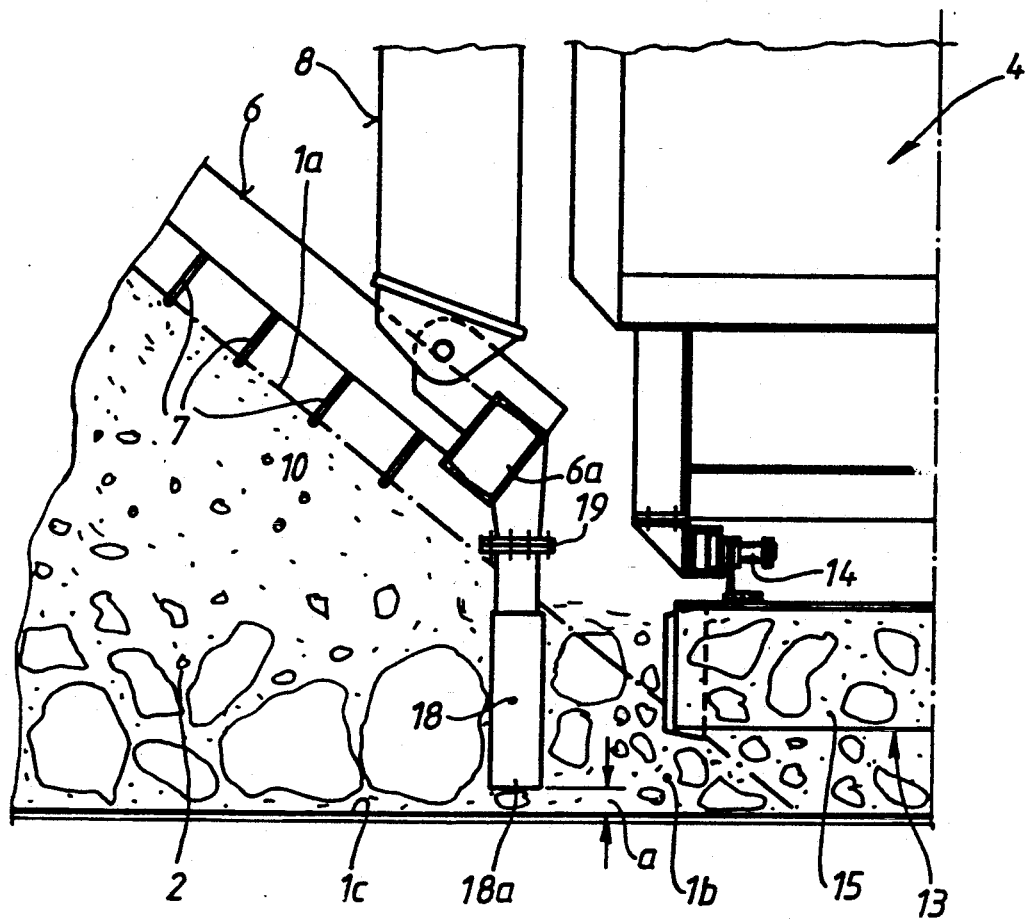
FIG. 3 shows a cut-away portion, approximately according to III in FIG. 2, on an enlarged scale.

The following further details are explained with the aid of the detail shown on an enlarged scale in FIG. 3 of the parts of the clearing apparatus located in the toe region of the heap.

In FIG. 3 it can be clearly seen that each bulk material activating tooth 18 is constructed in the form of a relatively straight—particularly in comparison with the scraping teeth 7 of the scraper rake 6—and particularly stable and longer ripping tooth which can have any suitable cross-section, particularly a round, circular, oval or polygonal cross-section, which permits it to travel through the bulk material 2 stored at the toe of the heap 1b, but must be of sufficiently stable construction that it neither bends nor breaks off during the activation of the loose bulk material or the large stones as described above. In this case—as FIG. 3 shows—these activating teeth 18 are arranged so that they hang freely downwards so that their free lower end 18a projects into the toe region 1b of the heap and is only a relatively small distance a from the bottom of the heap 1c. In the embodiment according to FIGS. 1 to 3 each activating tooth 18 projects downwards substantially at right angles.

In FIG. 3 it can also be seen that in the chosen embodiment the bulk material activating teeth 18 are preferably attached at the lower edge 6a of the scraper rake 6 pointing towards the toe of the heap 1b or the bottom of the heap 1c. In this case it may be assumed that the scraper rake 6 is of frame-like construction and its lower edge is formed by a lower beam 6a. Therefore—as shown in FIG. 3—the bulk material activating teeth 18 are attached to this lower beam 6a of the scraper frame 6. The activating teeth 18 could be permanently attached to this lower frame beam 6a; however, they are preferably attached so as to be removable, for example—as shown—by means of a screwable flanged joint 19.

In place of the fixing on the lower edge of the scraper rake 6, each activating tooth 18 could also be supported directly by the underside of the undercarriage 8, which can be readily imagined without a separate representation in a drawing.

In any case in this illustrated embodiment the bulk material activating teeth 18 are moved together with the scraper rake 6 by the undercarriage 8 along the bridge 4 in the direction of the double arrow 9 and thus are moved through the bulk material 2 which is located in the toe region of the heap 1b. With the activating teeth 18 attached to the lower frame beam 6a of the scraper rake, these activating teeth 18 are then additionally moved with the pivot movement of the scraper rake 6 through the bulk material 2 at the toe of the heap 1b in the direction of the double arrow 11. Moreover, the movement of each activating tooth can also be achieved in any other suitable manner, for example by its own lifting, lowering, rotating, pivoting or other movements which can be brought about by additional drive means.

The bulk material activating teeth 18 can also—as can be seen from this example according to FIGS. 1 to 3—be arranged at suitable distances from one another and in one single row lying parallel to the direction of travel (double arrow 9 or at right angles to the drawing plane of FIGS. 2 and 3) of the scraper arrangement of the scraper rake 6. It is also possible to arrange these bulk material activating teeth in the direction of travel of the scraper arrangement spaced apart and staggered relative to one another, which should be readily possible to imagine without additional representation in a drawing (particularly when studying FIG. 4).

From the explanations given above it can also be seen that the number of bulk material activating teeth to be provided in the region before the conveyor arrangement, that is to say upstream of the scraper conveyor 13, is dependent above all upon the working width of the scraper arrangement used and also upon the type of bulk material stored in the heap. In the case of a scraper arrangement with an extremely narrow working width, that is to say for example in the form of a clearing beam or the like, one single bulk material activating tooth constructed as described above may therefore be sufficient. However, in this case it is advantageous and preferably for the activating tooth to be held on the bridge 4 separately from the scraper arrangement, so that this one activating tooth can then move in the direction of movement along the bridge 4 in front of the scraper arrangement, advantageously hanging on its own support. Such a support can be for example a simplified and smaller form of the undercarriage 8 for the scraper arrangement 6 which is explained in relation to the example according to FIGS. 1 to 3.

Figure 4:
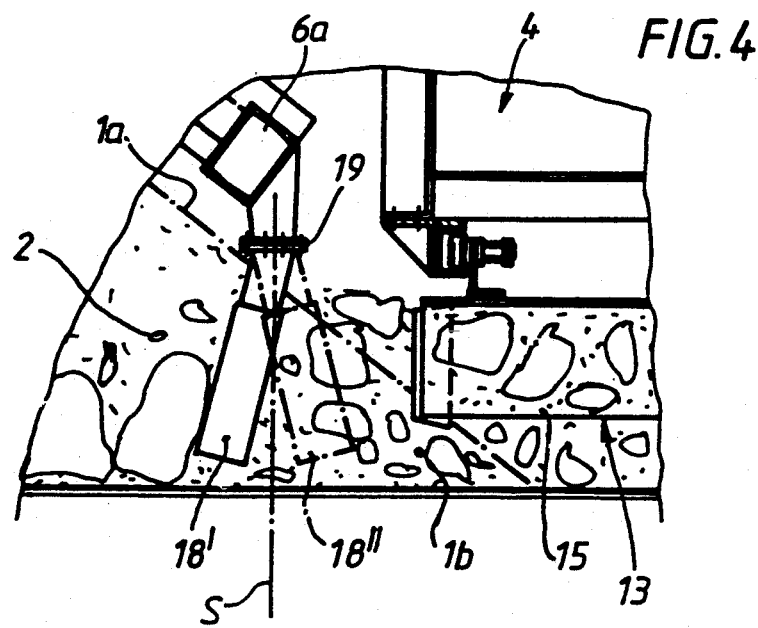
FIG. 4 shows a similar detail view to that of FIG. 3 but for explanation of other constructions of bulk material activating teeth.

For the construction of each bulk material activating tooth there are also the possibilities indicated in FIG. 4. Whereas in the example of FIGS. 1 to 3 each bulk material activating tooth 18 is attached so that it hangs downwards substantially vertically and extends into the pile of material, each activating tooth 18' or 18" according to the examples in FIG. 4 can also project downwards at an angle to the vertical and thus if required or preferably can also be adjustable in its inclination with respect to the vertical.

If the examples shown in FIG. 4 are considered with regard to the statements above, then the inclination of the (left-hand) bulk material activating tooth 1' shown in solid lines with respect to the vertical is chosen so that the activating tooth 18" points away from the scraper blades 15, whilst the (right-hand) activating tooth 18" shown by dash-dot lines is inclined towards the scraper blades 15. As a result of these different settings or constructions of the inclination the activating teeth 18' and 18" are different distances from the scraper blades 15 of the scraper conveyor 13. These distances can be chosen depending upon the size of the lumps to be expected in each case in the bulk material 2, i.e. when large stones or stone chippings are to be expected a greater distance is chosen between the activating teeth and the scraper blades 15 and when smaller stone chippings are to be expected a correspondingly smaller distance from the scraper blades 15 is chosen, whilst when medium-sized stones and stone chippings are to be expected the vertical arrangement shown in FIG. 3 is to be preferred. However, a meaningful combination of these types of arrangement or setting of the activating teeth along the bridge is also possible.

With regard to the representation in FIG. 2 it may be stated in amplification that the clearing device which is described can not only be equipped on one side of the bridge 4 with a scraper arrangement (scraper rake 6) but also similar scraper arrangement can be supported by the undercarriage 8 on the opposite side of the bridge 4, as is indicated at 6' by dash-dot lines, in which case the conveyor arrangement (scraper conveyor 13) is then adapted to such a construction and accordingly bulk material activating teeth 18 can also be arranged in the illustrated manner in the region before the long side of the scraper conveyor.

We claim:

1. Apparatus for clearing and removing bulk material from a pile thereof having a base and an inclined face, said apparatus comprising:
   a bridge supported for movement transversely of the inclined face of the bulk material pile;
   scraper means mounted on said bridge for engagement with the inclined face of the pile and for movement along said face in a direction to scrape material toward the base of the pile;
   conveyor means supported adjacent the base of the pile for removing the scraped-off bulk material; and
   at least one bulk material activating tooth supported by said bridge for movement therewith and extending into said pile upstream of said conveyor means to assist in the removal of the bulk material from said pile.

2. Apparatus as set forth in claim 1 wherein said activating tooth is operatively suspended from said bridge and has a free end projecting downwardly toward the base of the pile so as to interact with a toe region of the pile.

3. Apparatus as set forth in claim 2 wherein said tooth has a cross-sectional shape selected from the group consisting of round, polygonal, and oval.

4. Apparatus as set forth in claim 2 wherein said tooth is detachable.

5. Apparatus as set forth in claim 2 wherein said tooth projects downwardly substantially vertically.

6. Apparatus as set forth in claim 2 wherein said tooth projects downwardly at an inclination with respect to the vertical.

7. Apparatus as set forth in claim 2 wherein said tooth projects downwardly and is adjustable in inclination with respect to the vertical.

8. Apparatus as set forth in claim 2 wherein said tooth is supported for movement along said bridge in advance of said scraper means.

9. Apparatus as set forth in claim 2 including a plurality of said teeth.

10. Apparatus as set forth in claim 9 including an undercarriage supported for movement along said bridge.

11. Apparatus as set forth in claim 10 wherein said plurality of teeth are mounted on said undercarriage.

12. Apparatus as set forth in claim 9 wherein said plurality of teeth are mounted on said scraper means.

13. Apparatus as set forth in claim 12 wherein said scraper means comprises a scraper rake pivotally mounted on said undercarriage so as to be adjustable in inclination, said scraper rake having a frame beam extending along a lower edge of said scraper rake, said plurality of teeth being attached to said frame beam.

14. Apparatus as set forth in claim 9 wherein said teeth are spaced from one another and arranged in a plane parallel to the direction of travel of said scraper means.

15. Apparatus as set forth in claim 9 wherein said teeth are spaced apart in the direction of travel of said scraper means and angularly staggered relative to one another.

* * * * *